United States Patent [19]
Malik et al.

[11] Patent Number: 4,470,378
[45] Date of Patent: Sep. 11, 1984

[54] ENGINE WITH SIDE WALL MOUNTED VIBRATION ISOLATED MANIFOLD

[75] Inventors: Nasir M. Malik, Canton; Carl A. Yarkosky, Brighton; Richard B. Wallace, Plymouth, all of Mich.

[73] Assignee: General Motors Corporation, Detroit, Mich.

[21] Appl. No.: 427,664

[22] Filed: Sep. 29, 1982

[51] Int. Cl.³ .............................................. F02M 35/00
[52] U.S. Cl. .............................. 123/52 M; 123/52 MC
[58] Field of Search ............ 123/195 R, 195 C, 52 M, 123/52 MV, 52 MC; 60/323, 322

[56] References Cited

U.S. PATENT DOCUMENTS

| | | | |
|---|---|---|---|
| 2,003,485 | 7/1931 | Gehres | 123/52 M |
| 3,881,455 | 5/1975 | Beisanti | 123/563 |
| 3,975,468 | 8/1976 | Tuckey | 123/52 M |
| 4,083,339 | 4/1978 | Yamazaki et al. | 123/52 M |

Primary Examiner—Craig R. Feinberg
Assistant Examiner—David A. Okonsky
Attorney, Agent, or Firm—Robert J. Outland

[57] ABSTRACT

An internal combustion engine having side wall opening intake or exhaust ports is provided with a manifold carried along the side wall by a resilient vibration isolating mounting. Substantial separation of the supporting and sealing functions of the manifold is provided by use of separate resilient support and sealing isolator means, the support means acting between horizontal support surfaces spaced at a substantial distance from the vertical sealing surfaces of the manifold passages and ports between which the sealing means act.

4 Claims, 6 Drawing Figures

ENGINE WITH SIDE WALL MOUNTED
VIBRATION ISOLATED MANIFOLD

TECHNICAL FIELD

This invention relates to engines and more particularly to the mounting of engine manifolds to provide vibration isolation. In a particular embodiment the invention provides multidirectional vibration isolation of a side wall mounted intake manifold for an internal combustion engine with substantial separation of supporting and sealing functions.

BACKGROUND

It is well known in the art relating to engines to utilize manifolds to conduct intake charges to or exhaust charges from the multiple intake or exhaust ports of a multicylinder engine. On multicylinder in-line engines, the intake and exhaust manifolds have conventionally been mounted upon side walls through which the intake and exhaust ports open. On V-type engines, the exhaust manifolds have been most commonly mounted along the outer side walls of the cylinder banks while the intake manifolds for such engines have most often been mounted between the cylinder banks and attached to both inner side walls.

In these prior arrangements for manifold mounting, it has been usual to provide a hard, or non-resilient, mounting of the manifold on the engine cylinder head or block wall using a relatively hard (non-resilient) sealing gasket and involving direct metal to metal connection of the cylinder head or block and the manifold through attaching studs or bolts. Such mounting methods have not provided any substantial degree of vibration isolation between the engine cylinder block or head and the attached manifolds.

In a desire to reduce the transmitted noise level of various internal combustion engines, various vibration isolating mounting or damping arrangements have been proposed for components of the engines such as oil pans, rocker covers and the like. Recently, at least one engine model has been produced having vibration isolation connections between intake manifolds of a V-type engine. However Applicants are unaware of any prior arrangements proposed or utilized for vibration isolation of intake or exhaust manifolds carried on the side walls of in-line type internal combustion engines.

SUMMARY OF THE INVENTION

The present invention relates to vibration isolating mountings for multicylinder manifolds mounted along an upstanding side wall of a multicylinder engine. In a preferred embodiment the invention provides an engine intake manifold which may be adapted to support an intake air cooler core capable of being connected between a turbocharger compressor and the engine cylinders, wherein effective isolation mounting of the manifold on the engine cylinder head side wall is provided.

A particular feature of the mounting arrangement is that a major portion of the weight of the manifold is carried on generally horizontal supporting surfaces extending from means secured to the engine while separate sealing and securing means are provided to sealingly retain the manifold against the intake ports. Thereby a substantial separation of supporting and sealing functions is obtained which permits the design to provide optimum isolation performance even with relatively heavy manifold instructions.

These and other features and advantages of the present invention will be more fully understood from the following description of a preferred embodiment taken together with the accompanying drawings.

BRIEF DRAWING DESCRIPTION

DETAILED DESCRIPTION

Figure 1:
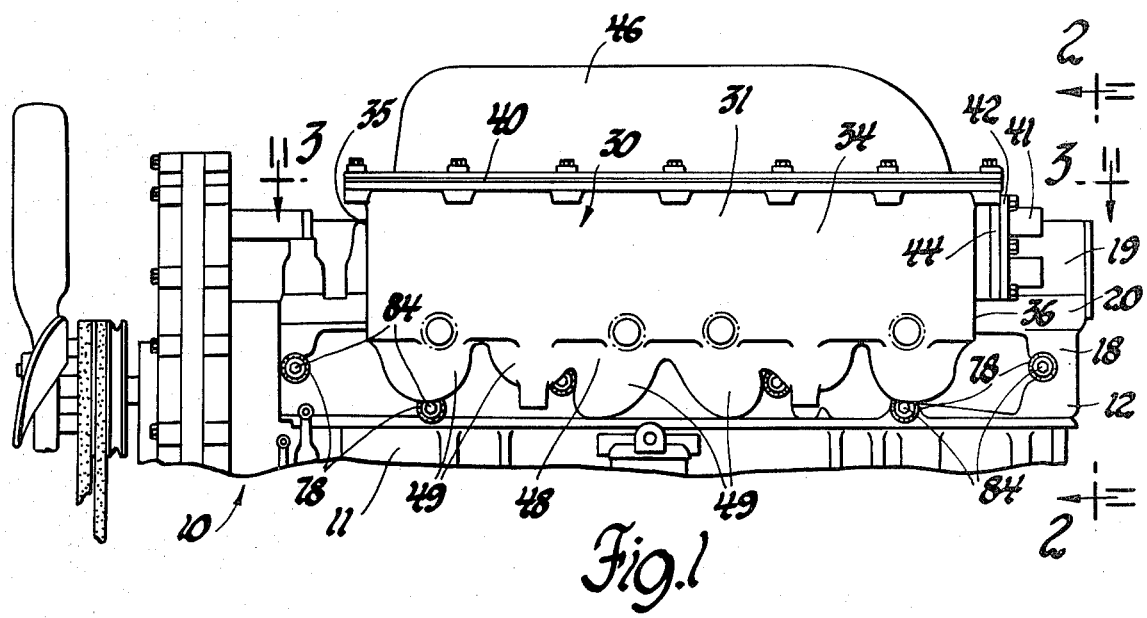
FIG. 1 is a fragmentary side view of the upper portions of an internal combustion engine having an isolation mounted intake manifold in accordance with the invention.
Figure 2:
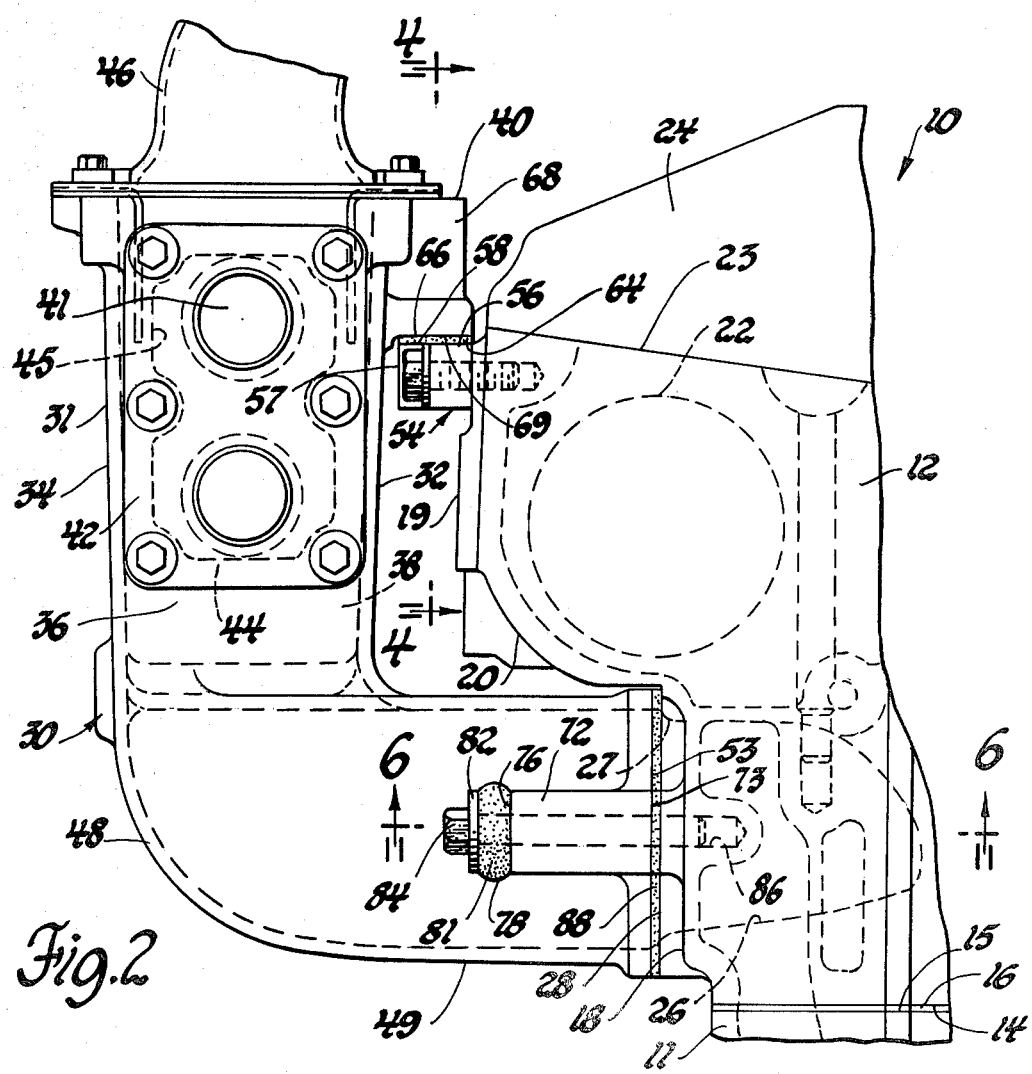
FIG. 2 is a fragmentary end view of the manifold mounting arrangement as seen from the plane of the line 2—2 of FIG. 1.
Figure 3:
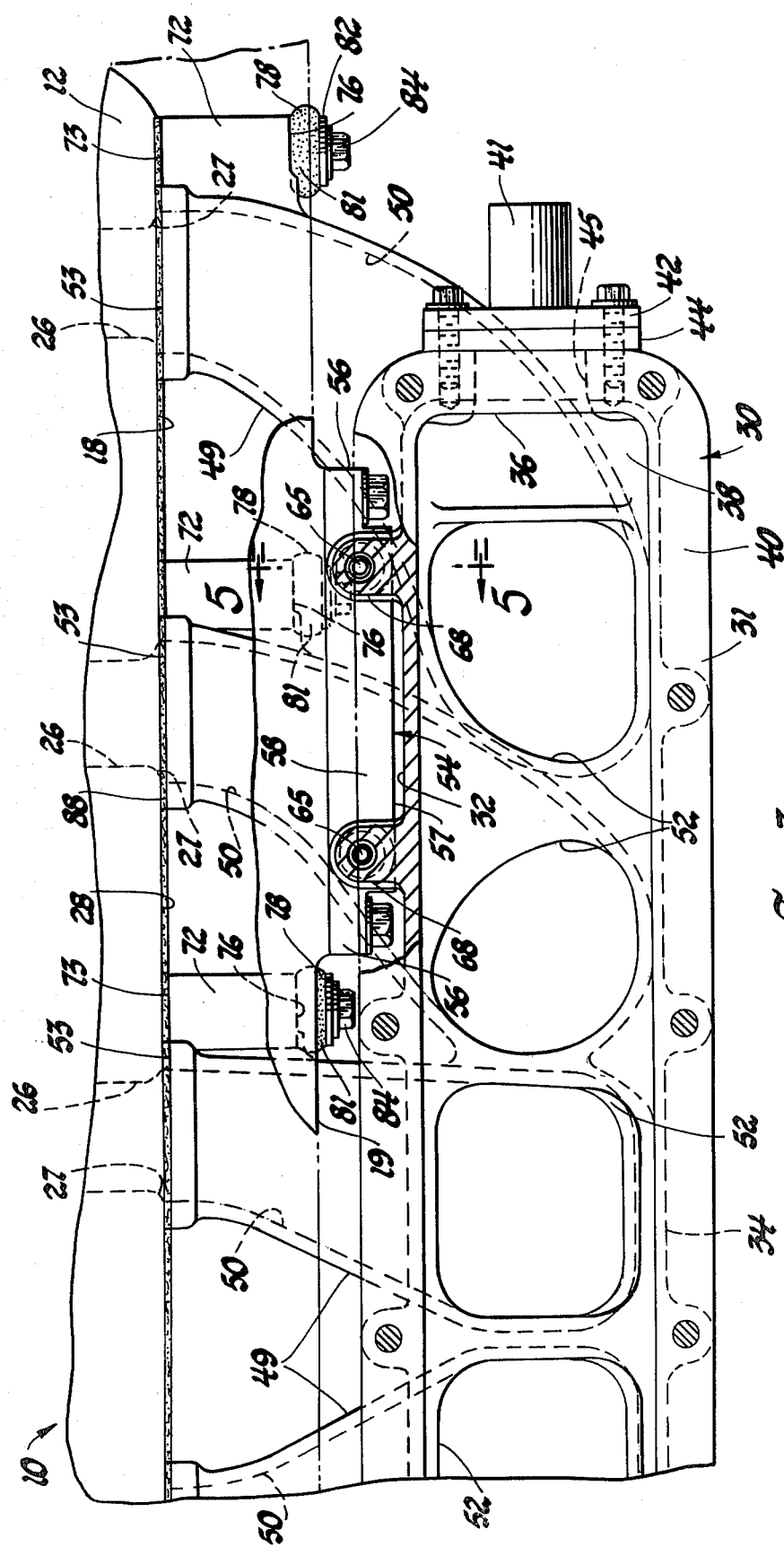
FIG. 3 is a fragmentary plan view with the inlet fitting removed from the plane of the line 3—3 of FIG. 1 with portions sectioned to illustrate features of the mounting means.
Figure 4:
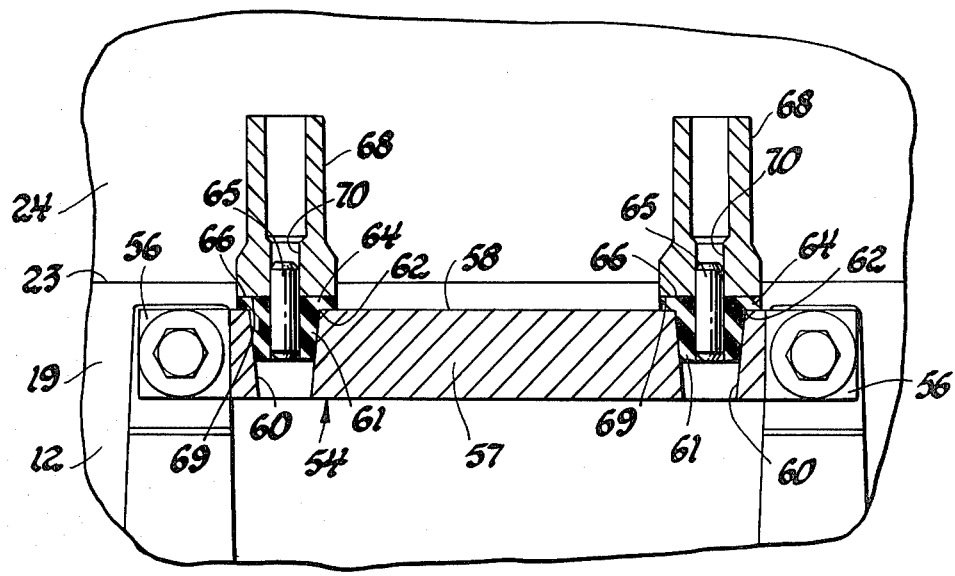
FIG. 4 is a fragmentary cross-sectional view from the plane of the line 4—4 of FIG. 2 showing details of the primary supporting and restraint means.
Figure 5:
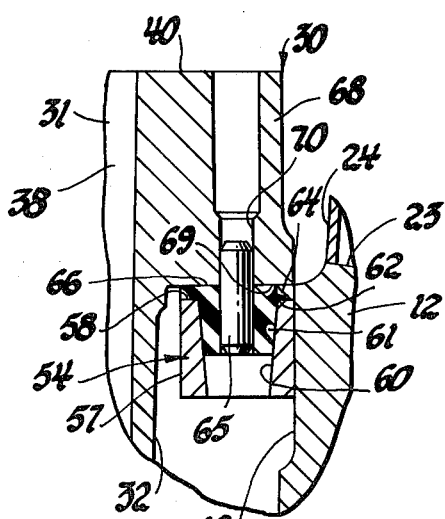
FIG. 5 is a transverse cross-sectional view from the plane of the line 5—5 of FIG. 3 further illustrating the means of FIG. 4.
Figure 6:
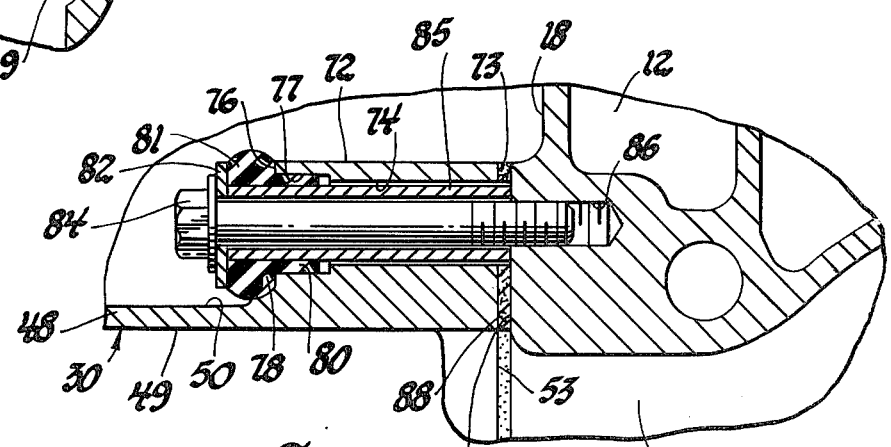
FIG. 6 is a horizontal cross-sectional view from the plane of the line 6—6 of FIG. 2 detailing construction of the sealing and securing means.

Referring now to the drawings in detail, numeral 10 generally indicates a 6 cylinder in-line diesel internal combustion engine for general purpose use but of a type particularly adapted for use in heavy duty trucks. Engine 10 includes a cylinder block 11 internally defining six vertically oriented longitudinally aligned cylinders, not shown, closed at their upper ends by a cylinder head 12.

The cylinder head includes a lower wall 14 which is seated on and fixedly secured in conventional fashion to an upper wall 15 of the engine cylinder block. A cylinder head gasket 16 is conventionally disposed between the operatively engaged cylinder head and block walls 14, 15 to seal the cylinders, coolant passages and the like against leakage at the joint.

The cylinder head further includes a side wall having lower and upper portions 18, 19 respectively. The lower side wall portion 18 extends upwardly, primarily in a generally vertical plane, from the lower wall 14 to about half the height of the cylinder head. There the side wall is interrupted by an outward protrusion 20 of the cylinder head that provides space internally for the mounting of a camshaft 22. The upper side wall portion 19 extends upwardly generally in a vertical plane spaced outwardly from that of the lower side wall portion 18 and extending from about the midpoint of the height of the cylinder head to its upper edge at a top wall 23, on which a rocker cover 24 is mounted in conventional fashion.

Within the cylinder head 12 each of the cylinders is provided with an intake port 26 extending from an inner opening, not shown, into its respective cylinder in or adjacent to the lower wall 14 to an outer opening 27 through the side wall lower portion 18. Surrounding each of the port openings 27, the lower side wall portion includes an upwardly inclined (vertical) outwardly facing sealing surface 28 extending longitudinally of the cylinder head and lying parallel with the generally vertical plane of the side wall lower portion.

In accordance with the invention, engine 10 is further provided with an intake manifold 30 mounted alongside the engine side wall 18, 19 and connected with the intake ports 26 to provide charging air to the engine cylinders. Manifold 30 includes an upper portion 31 having inner and outer side walls 32, 34 respectively and end walls 35, 36 which together internally define an enlarged plenum 38, open along its top, which extends through an upper wall 40 of the manifold.

Within the plenum 38 there is supported a heat exchanger core 41 having at one end a supporting flange 42 that is sealingly secured against a boss 44 provided on the end wall 36 of the manifold upper portion. An opening 45 in the boss 44 provides for connecting the heat exchanger core 41 externally of the plenum 38 with a suitable source of coolant, not shown. The open upper wall 40 of the manifold supports an inlet fitting 46 which extends upwardly and over the engine rocker cover to a resilient connection, not shown, with the compressor of an engine turbocharger, not shown, provided to supply compressed charging air to the engine intake manifold.

Below its plenum defining upper portion, the intake manifold is provided with a lower portion 48 comprising a plurality of downwardly and inwardly directed legs 49 which define individual passages 50. The legs and their passages extend from respective openings 52 in the bottom of the plenum chamber to inwardly facing (i.e. toward the engine) upwardly inclined sealing surfaces 53 positioned in parallel opposition with the outwardly facing sealing surface 28 surrounding the respective intake ports of the cylinder head. Passages 50 respectively connect each with an individual one of the intake ports for admitting air charges thereto.

The mounting of the manifold alongside the engine cylinder head side wall and the sealing of the connection between the manifold passages and the engine cylinder head inlet ports are such as to provide for a substantial degree of vibration isolation of the manifold, cooling core and inlet fitting assembly from the engine and its associated cylinder head.

Further, the vibration isolation mounting and sealing are accomplished in a manner that separates in large part the functions of supporting and restraining the weight of the manifold from that of sealing the ends of the manifold legs against the engine side wall surrounding the intake port openings.

To support a major portion of the manifold's weight, the engine is provided with a pair of suspension brackets 54 which are bolted at longitudinally spaced intervals to the cylinder head side wall upper portions adjacent their upper edges.

Brackets 54 each comprise longitudinally extending bars of rectangular cross section having reduced thickness bolting ears 56 and intermediate wider supporting portions 57 providing flat generally horizontal upwardly facing supporting surfaces 58. The supporting portions further include at either side, adjacent the ears 56, vertically extending upwardly enlarged frusto-conical restraint openings 60 in each of which is received the conically shaped lower end 61 of a resilient suspension isolator member 62. An annular flange 64 extends outwardly from the upper edge of the isolator's conical lower end and rests on the bracket horizontal supporting surface 58 surrounding the respective opening 60. A guide pin 65 is centrally retained within each flanged conical isolator member and extends vertically upwardly above the flat upper surface 66 thereof.

To coact with the brackets 54 and their suspension isolator members 62, the manifold is provided with four longitudinally spaced vertically extending columnar bosses 68 positioned inwardly along the upper end of the inner side wall and vertically aligned one with each of the support and restraint members. Bosses 68 each include downwardly facing generally horizontal coplanar support surfaces 69 having upwardly extending drilled openings 70 formed centrally therein.

In assembly, the support surfaces 69 of the bosses 68 are seated on the flat upper surfaces 66 of their respective resilient suspension isolator member 62 with the upwardly extending portions of the guide pins 65 received in close fitting relation within the openings 70. Thus a major portion of the weight of the manifold is carried by the opposed horizontal support surfaces 58 and 69 of the engine and manifold respectively through the resilient flanges 64 of the suspension isolator members. At the same time lateral motion of the manifold is resiliently restrained by coaction of the guide pins 65 received in the manifold openings 70 and the lower ends of the suspension isolator members 62 which are received in the frusto-conical restraint openings 60 of the brackets 54 attached to the cylinder head side wall upper portion.

In order to separately provide for vibration isolating sealing of the manifold legs against the lower side wall portion of the cylinder head at the respective intake port openings 28, the manifold is provided with a plurality of laterally extending columnar bosses 72 spaced longitudinally at various points along the manifold lower portion and attached to portions of the various manifold legs. Lateral bosses 72 include inner ends 73 coplanar with the inwardly facing sealing surfaces 53 at the ends of the manifold legs. From the inner ends 73, drilled openings 74 extend outwardly toward outer ends 76 of the bosses, the openings 76 having enlarged portions at 77 extending inwardly a short distance from the bosses outer ends 76.

At the outer end of each lateral boss, there is located a resiliently compressible isolator 78 having a sleeve portion 80 that fits snugly within the enlarged opening portion 77 of its respective boss. An enlarged head portion 81 of the isolator extends outwardly of the sleeve portion and is compressed against the outer end 76 of the respective boss by a separate washer 82 engaged by a bolt 84 that extends through a compression limiting sleeve 85 into threaded engagement with an opening 86 in the cylinder head side wall. The sleeve 85 extends between the washer 82 and the outer sealing surface 28 of the lower cylinder head wall to establish the spacing and therefore the amount of compression applied to the head portion of the isolator.

The actual sealing of the joints between the manifold legs and the cylinder head side wall at the respective inlet ports is accomplished by a resilient gasket 88 which is preferably reinforced with metallic inserts not shown. Compression of this gasket is controlled by the compression of the resilient isolators 78 as determined by the stop sleeves 85 and washers 82.

As a result of the construction heretofore described, there is provided for use with an engine having side wall opening intake or exhaust ports, a vibration isolating mounting arrangement. The arrangement is especially adaptable to manifolds of substantial size and weight since it provides for substantial separation of the supporting and sealing functions using opposed generally horizontal supporting surfaces of the engine and manifold to support the weight of the manifold and opposed generally vertical sealing surfaces of the manifold and engine (which may be spaced at a substantial distance from the supporting surfaces) along which to provide the sealing function at the several intake ports. In addition, vibration isolated lateral control of manifold movement is provided by downward extensions of the resilient suspension isolators which coact with conical openings in the support brackets and pins extending into the manifold columns to resiliently restrain lateral manifold movements.

The separation of supporting and sealing functions provides the ability to idealize the resilient characteristics of the supporting members and the sealing members to obtain the desired degree of vibration isolation for the particular manifold arrangement. An advantage of isolating a manifold, particularly one of large size, from the vibrations of the engine structure itself is the ability to control or modify the resulting audible vibrations or noise emissions from the engine housing and to thereby place the overall noise characteristics of the engine in a more suitable or desirable range and/or to reduce the level of transmitted noise.

While the invention has been disclosed in part by reference to features of a particular embodiment chosen for purposes of illustration, it should be understood that numerous changes could be made without departing from the spirit and scope of the inventive concepts described. Accordingly, it is intended that the invention not be limited to the described embodiment but that it have the full scope permitted by the language of the following claims.

The embodiments of the invention in which an exclusive property or privilege is claimed are defined as follows.

1. The combination of an engine having a plurality of fluid transmitting ports opening through a side wall and a manifold supported by said engine along said side wall, said manifold having multiple passages individually connected with said ports and a common plenum to which said passages are connected, wherein the improvement comprises vibration isolating mounting means for securing said manifold to said engine, said mounting means comprising opposed generally horizontal extending operatively engaging support surfaces on said engine and manifold respectively said engine and manifold support surfaces facing generally upwardly and downwardly respectively and having resilient isolation-effecting load supporting means sandwiched between said surfaces to carry a major portion of the weight of said manifold concentrated on said support surfaces, opposed upwardly inclined operatively engaging sealing surfaces surrounding said ports and said passages on said engine and manifold respectively and resilient isolation-effecting sealing means sandwiched between and engaging said sealing surfaces to deter fluid leakage between them, and securing means adjacent said ports and passages and maintaining said engine and manifold sealing surfaces in sealing engagement with said sealing means, said securing means including resilient compression means engaging one of a group comprising said engine and said manifold and maintaining vibration isolation between them whereby a vibration isolating manifold mounting arrangement having substantial separation of supporting and sealing functions is provided.

2. The combination of an engine having a plurality of fluid transmitting ports opening through a side wall and a manifold supported by said engine along said side wall, said manifold having multiple passages individually connected with said ports and a common plenum to which said passages are connected, wherein the improvement comprises vibration isolating mounting means for securing said manifold to said engine, said mounting means comprising opposed generally horizontally extending operatively engaging support surfaces on said engine and manifold respectively and located at a substantial distance from said ports, said engine and manifold support surfaces facing generally upwardly and downwardly respectively and having resilient isolation-effecting load supporting, means sandwiched between said surfaces to carry a major portion of the weight of said manifold concentrated on said support surfaces, opposed upwardly inclined operatively engaging sealing surfaces surrounding said ports and said passages on said engine and manifold respectively and resilient isolation-effecting sealing means sandwiched between and engaging said sealing surfaces to deter fluid leakage between them, and securing means adjacent said ports and passages and maintaining said engine and manifold sealing surfaces in sealing engagement with said sealing means, said securing means including resilient compression means engaging one of a group comprising said engine and said manifold and maintaining vibration isolation between them whereby a vibration isolating manifold mounting arrangement having substantial separation of supporting and sealing functions is provided.

3. The combination of an engine having a side wall with a plurality of fluid transmitting ports opening therethrough and a manifold supported by said engine along said side wall, said manifold having multiple passages individually connected with said ports and a common plenum to which said passages are connected, wherein the improvement comprises vibration isolating mounting means for securing said manifold to said engine, said mounting means comprising opposed generally horizontally extending operatively engaging support surfaces on said engine and manifold respectively and located at a substantial distance in the vertical direction from said ports, said engine and manifold support surfaces facing generally upwardly and downwardly respectively and having resilient isolation-effecting load supporting means sandwiched therebetween to carry a major portion of the weight of said manifold concentrated on said support surfaces, lateral restraint means adjacent to said support surfaces and effective to restrict lateral movement between them, said lateral restraint means including first and second laterally opposed means having substantial vertical extent and respectively connected with said engine and manifold and resilient isolation means disposed between said first and second laterally opposed means, opposed upwardly inclined operatively engaging sealing surfaces surrounding said ports and said passages on said engine and manifold respectively and resilient isolation-effecting sealing means sandwiched between and engaging said sealing surfaces to deter fluid leakage between them, and securing means adjacent said ports and passages and maintaining said engine and manifold sealing surfaces in sealing engagement with said sealing means, said securing means including resilient compression means engaging one of a group comprising said engine and said manifold and maintaining vibration isolation between them whereby a vibration isolating manifold mounting arrangement having substantial separation of supporting and sealing functions is provided.

4. In combination with an engine having a plurality of ports opening through a side wall, a manifold having an internal plenum and passages connecting the plenum with said ports and isolation mounting means supporting the manifold along said side wall, said mounting means comprising resilient load carrying means having opposed surfaces extending generally horizontally between and in contact with vertically opposed elements of the engine and manifold adjacent the plenum and arranged to support a major portion of the manifold weight in vibration isolation from the engine, resilient sealing means separate from said load carrying means and disposed between elements of the engine and manifold defining said manifold passages and the connected engine ports, and securing means between the engine and manifold and effecting controlled compression of said resilient sealing means, said securing means including resilient compression means between the engine and manifold and maintaining resilient isolation thereof through the securing means, said mounting means thereby providing vibration isolation with substantial separation of supporting and sealing functions.

* * * * *